United States Patent
Carson et al.

(10) Patent No.: US 9,575,775 B2
(45) Date of Patent: Feb. 21, 2017

(54) AUTORUN ON EJECT

(71) Applicant: International Business Machines Corporation, Armonk, NY (US)

(72) Inventors: Craig A. Carson, Mirrabooka (AU); Bret W. Dixon, South Perth (AU); Benjamin T. Horwood, Highgate (AU); John A. Kaputin, Rockingham (AU)

(73) Assignee: International Business Machines Corporation, Armonk, NY (US)

( * ) Notice: Subject to any disclaimer, the term of this patent is extended or adjusted under 35 U.S.C. 154(b) by 298 days.

(21) Appl. No.: 14/200,059

(22) Filed: Mar. 7, 2014

(65) Prior Publication Data
US 2015/0254085 A1  Sep. 10, 2015

(51) Int. Cl.
G06F 3/00 (2006.01)
G06F 9/445 (2006.01)

(52) U.S. Cl.
CPC ...................... G06F 9/445 (2013.01)

(58) Field of Classification Search
None
See application file for complete search history.

(56) References Cited

U.S. PATENT DOCUMENTS

| | | | | |
|---|---|---|---|---|
| 6,405,362 B1* | 6/2002 | Shih | .......................... | G06F 8/61 713/1 |
| 6,529,992 B1* | 3/2003 | Thomas | ................... | G06F 9/445 711/1 |
| 7,636,799 B2 | 12/2009 | Yang et al. | | |
| 8,402,456 B2 | 3/2013 | Kang et al. | | |
| 9,043,789 B2* | 5/2015 | Tsirkin | ................ | G06F 9/45558 718/1 |
| 2005/0250536 A1* | 11/2005 | Deng | ................... | H04W 76/021 455/558 |
| 2009/0293052 A1 | 11/2009 | Kim | | |
| 2011/0138378 A1* | 6/2011 | Chang | ..................... | G06F 9/445 717/175 |
| 2013/0060977 A1* | 3/2013 | Chun | ................... | G06F 13/4081 710/73 |

FOREIGN PATENT DOCUMENTS

KR  1020130038034 A  4/2013

* cited by examiner

*Primary Examiner* — Elias Mamo
(74) *Attorney, Agent, or Firm* — Reza Sarbakhsh

(57) ABSTRACT

A method for automatic execution of at least one program associated with a mounted medium, wherein the mounted medium is ejected from a device is provided. The method may include determining if an automatic program initiation on eject is required, wherein the determining is based on a detection of the mounted medium being mounted in the device. The method may also include registering the required automatic program initiation on eject, wherein the registering is based on the determination of the automatic program initiation on eject being required. The method may include storing an executable program content associated with the registered automatic program initiation on eject. Additionally, the method may include executing the stored executable program content, wherein the execution is based on a detection of the mounted medium being ejected from the device. The method may include deregistering the required automatic program initiation on eject.

20 Claims, 4 Drawing Sheets

AUTORUN ON EJECT

FIELD OF THE INVENTION

The present invention relates generally to the field of computing, and more particularly to mountable computer hardware.

BACKGROUND

An automatic program initiation feature (e.g., AutoRun and AutoPlay), may be a component of an operating system, such as Microsoft Windows. As such, AutoRun and AutoPlay may dictate what actions the system may take when a mountable hardware device or media, such as a USB drive, CD, or DVD is inserted into the device running the operating system. AutoPlay is based on a set of handler applications registered with the AutoPlay system. Each media type (e.g., pictures, music, and video) may have a set of registered handlers which either play or display that type of media. Additionally, each hardware device may have a default action which may occur on discovery of a particular media type, or the automatic program initiation dialog may prompt the user as to what action to take.

SUMMARY

According to one embodiment, a method for automatic execution of at least one program associated with a mounted medium, wherein the mounted medium is ejected from a device is provided. The method may include determining if an automatic program initiation on eject is required, wherein the determining is based on a detection of the mounted medium being mounted in the device. The method may also include registering the required automatic program initiation on eject, wherein the registering is based on the determination of the automatic program initiation on eject being required. The method may include storing an executable program content associated with the registered automatic program initiation on eject. Additionally, the method may include executing the stored executable program content, wherein the execution is based on a detection of the mounted medium being ejected from the device. The method may include deregistering the required automatic program initiation on eject, wherein the deregistering is based on the executing of the executable program content.

According to another embodiment, a computer system for automatic execution of at least one program associated with a mounted medium, wherein the mounted medium is ejected from a device is provided. The computer system may include one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method. The method may include determining if an automatic program initiation on eject is required, wherein the determining is based on a detection of the mounted medium being mounted in the device. The method may also include registering the required automatic program initiation on eject, wherein the registering is based on the determination of the automatic program initiation on eject being required. The method may include storing an executable program content associated with the registered automatic program initiation on eject. Additionally, the method may include executing the stored executable program content, wherein the execution is based on a detection of the mounted medium being ejected from the device. The method may include deregistering the required automatic program initiation on eject, wherein the deregistering is based on the executing of the executable program content.

According to yet another embodiment, a computer program product for automatic execution of at least one program associated with a mounted medium, wherein the mounted medium is ejected from a device is provided. The computer program product may include one or more computer-readable storage devices and program instructions stored on at least one of the one or more tangible storage devices, the program instructions executable by a processor. The computer program product may include program instructions to determine if an automatic program initiation on eject is required for the at least one program associated with the mounted medium, wherein the determining is based on a detection of the mounted medium being mounted in the device. The computer program product may also include program instructions to register the required automatic program initiation on eject, wherein the registering is based on the determination of the automatic program initiation on eject being required. The computer program product may further include program instructions to store an executable program content associated with the registered automatic program initiation on eject. Additionally, the computer program product may include program instructions to execute the stored executable program content, wherein the execution is based on a detection of the mounted medium being ejected from the device. The computer program product may also include program instructions to deregister the required automatic program initiation on eject, wherein the deregistering is based on the executing of the executable program content.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
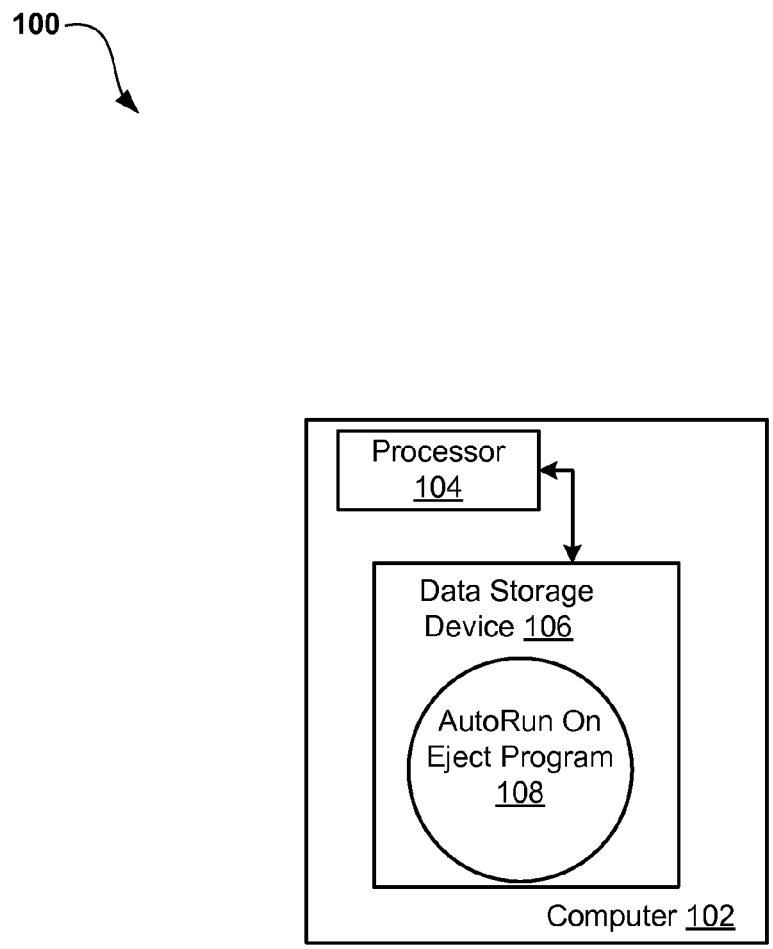
FIG. 1 illustrates a computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computing, and more particularly to mountable computer hardware. The following described exemplary embodiments provide a system, method and program product to, among other things, perform automatic program initiation, such as AutoRun, on eject.

As previously described, an automatic program initiation feature, such as AutoRun and AutoPlay may dictate what actions the system takes when a mountable hardware device or media, such as a USB drive, CD, or DVD is inserted into the hardware device running an operating system. For example, on a windows-based operating system, an AutoRun.inf file may specify a program to run on the mountable medium. Additionally, AutoPlay is a default service that may run when an AutoRun.inf file is not found. However, the operation of AutoRun and AutoPlay may also be affected by the type of drive and certain registry settings. The AutoRun feature may allow the creators of mountable drive content to initiate program execution beyond normal operating system behavior. As such, when a mountable medium is ejected from a system, the operating system may take certain predefined actions. However, when a mountable medium is ejected from a system, the operating system may not allow the creator of the mountable medium content to initiate program execution which may be beneficial under certain circumstances. For example, it may be useful to initiate program execution when ejecting a USB wireless dongle. If the USB wireless dongle is ejected without a proper "disconnect", the ejection may cause the network to become inoperable. Therefore, an automatic program initiation feature, such as an AutoRun on eject may make it possible to execute specific program(s) on a dongle medium (e.g. cleanup) in the event that the dongle is ejected without first disconnecting from the network. As such, it may be advantageous, among other things to implement a method to perform AutoRun on eject.

According to at least one embodiment, program content on a mountable medium may be automatically executed when the medium is ejected from a system. The method may introduce a means of identifying on the medium at least one program to be executed when the medium is ejected. The identifying of the medium may occur when the medium is initially mounted. As such, when a mount event is detected, the operating system may check the device content. For example, the operating system may look for an AutoRun.inf file in the root directory of the mounted medium, to determine if automatic program initiation on eject (i.e., AutoRun on eject) is required. If an automatic program initiation on eject is required, the present embodiment may require that the indicated program(s) are loaded into storage (e.g., memory or disk) for later execution. Then, on detecting an eject event associated with the mounted medium, the present embodiment may check to determine if automatic program initiation is required prior to the ejection of the mounted medium. If automatic program initiation is required prior to the ejection of the mounted medium, then the registry associated with the device running the operating system may be updated to reflect that automatic program initiation is required prior to the ejection of the mounted medium. Then, based on the update to the registry, the present embodiment may initiate the execution of the registered program(s) upon ejection of the mounted medium The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for the automatic execution of program content on a mountable medium when the mountable medium is ejected from a system. According to one implementation of the present embodiment, an event may be detected when a removable medium is mounted. As such, the medium's content may be examined to determine if the AutoRun configuration is present on the medium. If the AutoRun configuration is present, the method may examine the configuration. For example, the method may examine an "AutoRun.inf" file to determine if a stanza exists requiring AutoRun on eject. Then, if AutoRun on eject is required, the present embodiment may record that AutoRun on eject is required for this device in the registry of the device running the operating system. Additionally, the present embodiment may load executable program content onto a storage device (e.g., on a memory storage device or on a disk storage device) from the medium according to the configuration, for later execution, such as on eject of the mountable medium.

As such, when the medium is ejected from a device, the present embodiment may detect the event and examine the registry associated with the operating system of the device to determine if AutoRun on eject is required for the ejected medium. If AutoRun on eject is required for the device, the registered programs, that were stored when the medium was mounted, may be executed, and the AutoRun on eject requirement may be deregistered for the relevant device.

Referring now to FIG. 1, an exemplary computer environment 100 in accordance with one embodiment is depicted. The computer environment 100 may include a computer 102 with a processor 104 and a data storage device 106 that is enabled to run an AutoRun on eject program 108. The computer environment 100 may include a plurality of computers 102 only one of which is shown for illustrative brevity. It may be appreciated that FIG. 1 provides only an illustration of one implementation and does not imply any limitations with regard to the environments in which different embodiments may be implemented. Many modifications to the depicted environments may be made based on design and implementation requirements.

As will be discussed with reference to FIG. 4, client computer 102 may include internal components 800 and external components 900, respectively. Client computer 102 may be, for example, a mobile device, a telephone, a personal digital assistant, a netbook, a laptop computer, a tablet computer, a desktop computer, or any type of computing device capable of running a program and capable of detecting a media load or eject event.

A program, such as an AutoRun on eject program 108 may run on the client computer 102. As previously described, an AutoRun on eject program 108 may provide the automatic execution of program content on a mountable medium when the mountable medium is ejected from a system. For example, a user using client computer 102 may utilize the AutoRun on eject program 108 to ensure that the program(s) that may require execution when the medium is ejected are identified. The AutoRun on eject method is explained in further detail below with respect to FIGS. 2-3.

Figure 2:
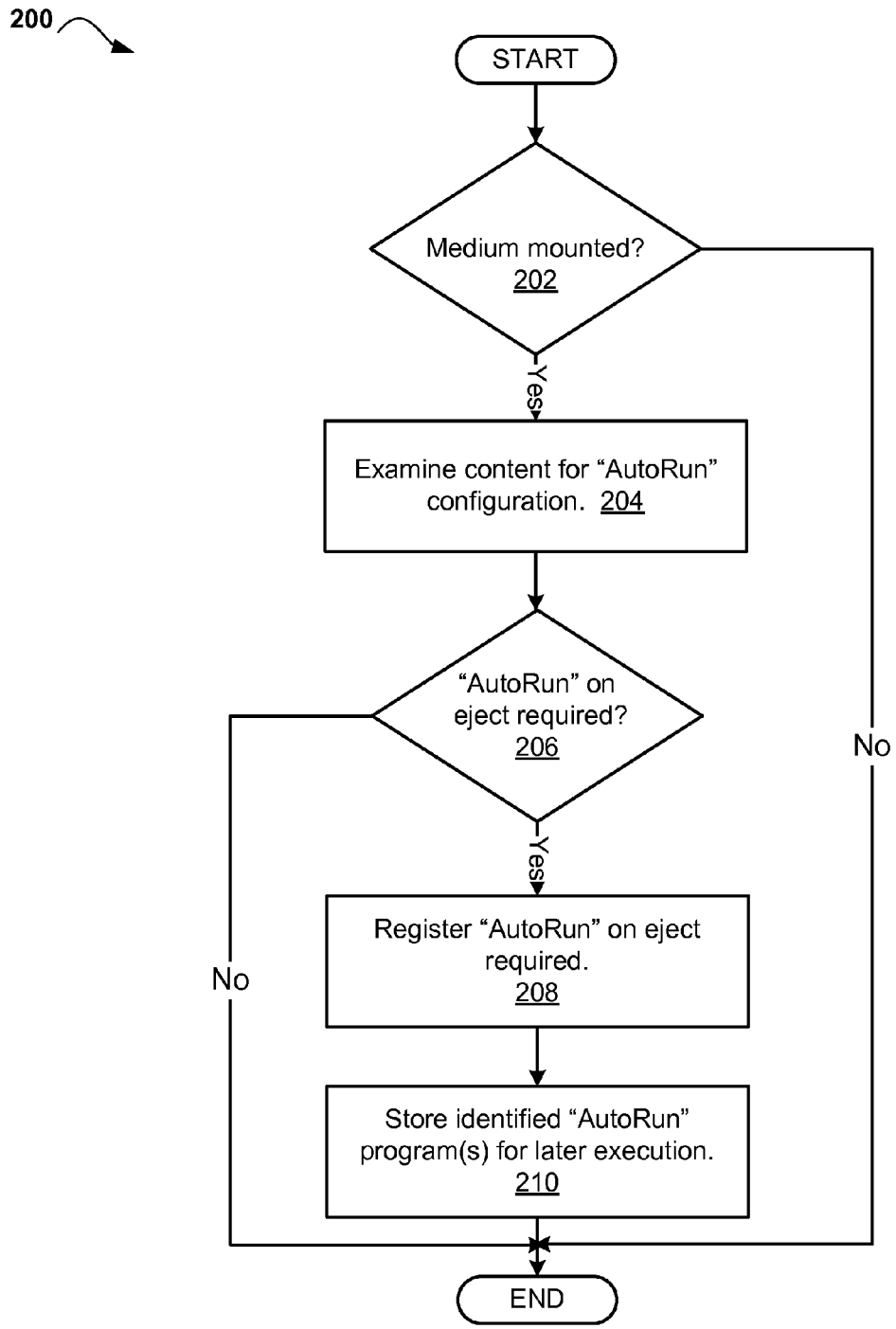
FIG. 2 is an operational flowchart illustrating the steps carried out by a program when a removable medium is mounted according to at least one embodiment.
Figure 3:
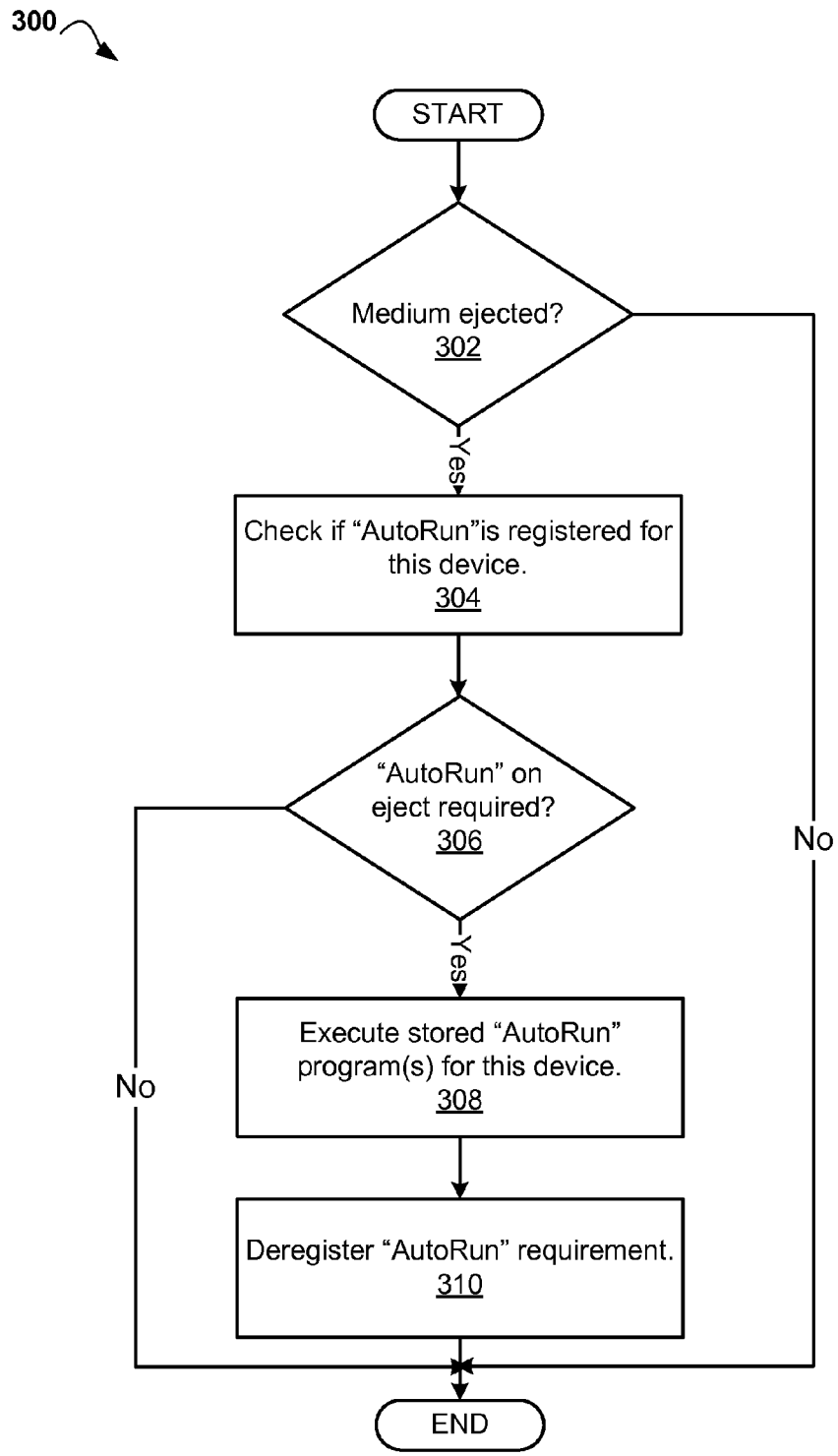
FIG. 3 is an operational flowchart illustrating the steps carried out by a program when a removable medium is ejected according to at least one embodiment.

FIGS. 2-3, operational flowcharts illustrating the steps carried out by a program for identifying on a medium at least one program that may require execution when the medium is ejected according to at least one embodiment are depicted. For example, the AutoRun on eject program 108 (FIG. 1) may be implemented as running on a client computer 102 (FIG. 1) (FIG. 1). As previously described, the AutoRun on eject program 108 may provide the automatic execution of program content on a mountable medium when the mounted medium is ejected from a system. Client computer 102 (FIG. 1) may automatically execute the AutoRun on eject program 108 (FIG. 1). As previously explained, the AutoRun on eject program may identify on a medium at least one program that may require execution when the medium is ejected. According to one implementation, the identifying of the program(s) on the medium may occur when the medium is initially mounted. Then, on detecting an eject event by the AutoRun on eject program 108 (FIG. 1), the AutoRun on eject program 108 (FIG. 1) may check to determine if automatic program initiation is required. The determination as to whether automatic program initiation is required may be based on the check that was made during the initial mounting of the same medium. The implementation for identifying on a medium a program or programs that may require execution when the medium is ejected is described in more detail below.

Referring now to FIG. 2, an operational flowchart 200 illustrating the steps carried out by a program when a removable medium is mounted according to at least one embodiment is depicted. At 202, it is determined whether a medium is mounted. According to at least one embodiment, when a removable medium is mounted, the AutoRun on eject program 108 (FIG. 1) may detect the event. For example, if a user who is using a client computer 102 (FIG. 1) mounts a removable medium, such as a CD ROM, into the client computer 102 (FIG. 1) (i.e., the device), then the AutoRun on eject program 108 may detect that the CD ROM has been mounted. If at 202, it is determined that a medium is not mounted, then the program may terminate. The removable medium (i.e., mounted medium) may include any device (e.g., external hard drive, USB, DVD, etc.) that can be attached and removed from another processing device (e.g., smartphone, PDA, etc.) having an operating system, whereby the removable medium includes any program or instruction set that may be utilized by the operating system of the processing device.

However, if at 202 it is determined that a medium is mounted, then at 204, the mounted medium's content may be examined for an automatic program initiation on eject (i.e., the AutoRun configuration) feature. As such, the AutoRun on eject program 108 may initiate the operating system to examine a medium's content, such as CD ROM's content in the previous example, to determine if the AutoRun (i.e., automatic program initiation on eject) configuration is present on the device (i.e., client computer 102 (FIG. 1)).

Then at 206, it is determined whether an AutoRun on eject is required. Therefore, the present embodiment may determine whether automatic program initiation on eject, (i.e., AutoRun on eject) is required for the mounted medium. The determination may be based on the previous examination in step 204 of the mounted medium's content for a system configuration file to determine if AutoRun on eject (i.e., automatic program initiation on eject) is required. For example, AutoRun on eject program 108 (FIG. 1) may examine a configuration file associated with the CD ROM in previous example, such as an AutoRun.inf file in the root directory, to determine if a stanza exists requiring AutoRun on eject for the mounted medium. If at 206, it is determined that an AutoRun on eject is not required then the program may terminate.

However, if at 206, it is determined that an AutoRun on eject is required then at 208 the requirement for the AutoRun on eject may be registered. Therefore, the present embodiment may record in the registry of the device (e.g., computer 102 (FIG. 1)) in which the medium is mounted that AutoRun on eject is required for this mountable medium (e.g., CD ROM).

Then, at 210, the present embodiment may store the identified auto run program(s) for later execution. As such, according to one implementation, AutoRun on eject program 108 (FIG. 1) running on client computer 102 (FIG. 1) may load executable program content associated with the AutoRun on eject requirement from the mounted medium into memory or disk according to the configuration file, for later execution. For example, the program content may be executed during a later event such as when the mounted medium is ejected. As such, according to one implementation, the AutoRun on eject program 108 may load the indicated program(s) (i.e., the identified AutoRun program (s)) into storage (e.g., memory or disk) for later execution.

Referring now to FIG. 3, an operational flowchart 300 illustrating the steps carried out by a program when a removable medium is ejected according to at least one embodiment is depicted. At 302, it is determined whether a medium is ejected. According to at least one embodiment, when a removable medium is ejected, the AutoRun on eject program 108 (FIG. 1) may detect the event. For example, if a user who is using a client computer 102 (FIG. 1) mounts a removable CD ROM into the device, then ejects the mounted CD ROM, the AutoRun on eject program 108 may detect that the CD ROM has been ejected. If at 302, it is determined that a medium is not ejected, then the program may terminate.

However, if at 302 it is determined that a medium is ejected, then at 304, the system configuration file (i.e., registry) of the device in which the medium is mounted may be examined to determine if the AutoRun on eject is registered for this medium. For example, the AutoRun on eject program 108 may examine a client computer's 102 (FIG. 1) configuration file to determine if the AutoRun on eject feature is required for the mounted medium.

Then at 306, it is determined whether an AutoRun on eject is required. Therefore, based on the previous examination of the system configuration file in step 304, it is determined whether an automatic program initiation on eject (i.e., AutoRun on eject) is required and has been registered for the mounted medium. For example, AutoRun on eject program 108 (FIG. 1) may examine a configuration file, such as an AutoRun.inf file associated with client computer 102 (FIG. 1) to determine if a stanza exists requiring AutoRun on eject for the mounted medium. If at 306, it is determined that an AutoRun on eject is not required then the program may terminate.

If at 306, it is determined that an AutoRun on eject is required then at 308 the stored AutoRun program(s) for the device are executed. Therefore, according to the present embodiment, the registered program(s) that were stored when the medium was mounted, may be executed. Then, at 310, the present embodiment may deregister the AutoRun requirement. As such, the AutoRun on eject requirement may be deregistered for the relevant device. As such, according one implementation, AutoRun on eject program 108 (FIG. 1) associated with client computer 102 (FIG. 1) may deregister the AutoRun on eject requirement in the system configuration file for the mounted device following the execution of the at least one registered program that was stored when the medium was mounted.

However, according to one implementation, in the event that an AutoRun on eject is registered and the operating system is shutdown or put in standby (e.g., without the mounted medium first being ejected) the present embodiment may require further logic to detect this condition, and deregister the AutoRun on eject as appropriate. Additionally, according to yet another implementation, the apparatus for the method may be the program execution of the required functions. As such, the program execution of the required functions may be integrated into an existing operating system function such as the "AutoRun" services that execute medium content when a medium is mounted. In an alternate implementation, the present embodiment may function independently of the operating system by registering itself as an "exit" which may be called by the operating system when specific events occur, such as an eject event.

Furthermore, for security purposes, the present embodiment may prompt a user (e.g., via a dialog box) to confirm that the user wants to permit the AutoRun program(s) to run immediately prior to running the configured content. Additionally, according to yet another alternate implementation, the embodiment may interrogate existing operating system settings to determine if "AutoRun" features are disabled. Also, the present embodiment may be applicable to any mountable medium that can store executable program content, such as a thumb drive, CD, DVD, external hard drive, etc.

Figure 4:
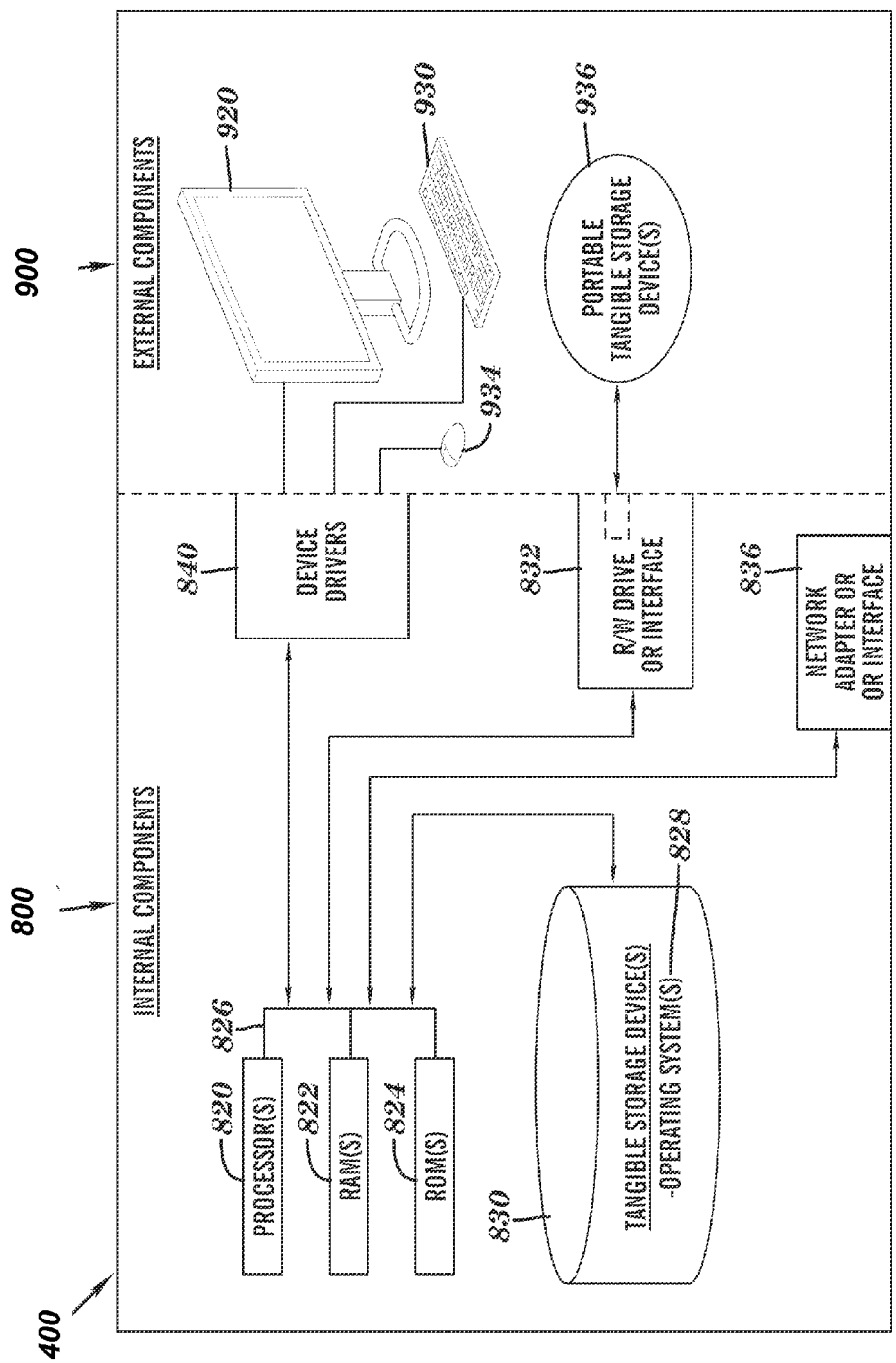
FIG. 4 is a block diagram of internal and external components of computers and servers depicted in FIG. 1 according to at least one embodiment.

FIG. 4 is a block diagram 400 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1) include respective sets of internal components 800 and external components 900 illustrated in FIG. 4. Each of the sets of internal components 800 includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and AutoRun on eject program 108 (FIG. 1) in client computer 102 is stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as AutoRun on eject program 108 can be stored on one or more of the respective portable computer-readable tangible storage devices 936, read via the respective R/W drive or interface 832 and loaded into the respective hard drive 830.

Each set of internal components 800 also includes network adapters or interfaces 836 such as a TCP/IP adapter cards, wireless Wi-Fi interface cards, or 3G or 4G wireless interface cards or other wired or wireless communication links. The AutoRun on eject program 108 in client computer 102 can be downloaded to client computer 102 from an external computer via a network (for example, the Internet, a local area network or other, wide area network) and respective network adapters or interfaces 836. From the network adapters or interfaces 836, the AutoRun on eject program 108 in client computer 102 is loaded into the respective hard drive 830. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for automatic execution of at least one program associated with a mounted medium capable of storing an executable program content, wherein the mounted medium is ejected from a device, the method comprising:

determining if an automatic program initiation on eject is required for the at least one program associated with the mounted medium, wherein the determining is based on a detection of the mounted medium being mounted in the device;

registering the required automatic program initiation on eject, wherein the registering is based on the determination of the automatic program initiation on eject being required;

storing, on the device, the executable program content associated with the registered automatic program initiation on eject, wherein the executable program content associated with the registered automatic program initiation on eject is written and stored on the mounted medium at the time the mounted medium is mounted in the device and comprises of a plurality of auto run programs that is stored for later execution;

executing the executable program content stored on the device, wherein the execution is based on a detection of the mounted medium being ejected from the device; and deregistering the required automatic program initiation on eject, wherein the deregistering is based on the executing of the executable program content, wherein determining if an automatic program initiation on eject is required and storing, on the device, the executable program content, are performed prior to detecting an eject event.

2. The method of claim 1, wherein the determining if the automatic program initiation on eject is required for the at least one program associated with the mountable medium comprises examining a system configuration file associated with the mounted medium.

3. The method of claim 1, wherein the registering the required automatic program initiation on eject comprises registering the required automatic program initiation on eject in a system registry associated with the device in which the mountable medium is mounted.

4. The method of claim 1, wherein the storing an executable program content comprises a loading of the executable program content associated with the registered automatic program initiation on eject for the at least one program associated with the mounted medium onto at least one storage device.

5. The method of claim 4, wherein the at least one storage device comprises at least one of memory storage and disk storage.

6. The method of claim 3, wherein the determining if the automatic program initiation on eject is required for the at least one program associated with the ejected mounted medium comprises examining the system registry associated with the device in which the mounted medium is ejected.

7. The method of claim 1, wherein the mountable medium comprises a mountable medium capable of storing an executable program content.

8. A computer system for automatic execution of at least one program associated with a mountable medium capable of storing an executable program content, wherein the mountable medium is ejected from a device, the computer system comprising:

one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:

determining if an automatic program initiation on eject is required for the at least one program associated with the mounted medium, wherein the determining is based on a detection of the mounted medium being mounted in the device;

registering the required automatic program initiation on eject, wherein the registering is based on the determination of the automatic program initiation on eject being required;

storing, on the device, the executable program content associated with the registered automatic program initiation on eject, wherein the executable program content associated with the registered automatic program initiation on eject is written and stored on the mounted medium at the time the mounted medium is mounted in the device and comprises of a plurality of auto run programs that is stored for later execution;

executing the executable program content stored on the device, wherein the execution is based on a detection of the mounted medium being ejected from the device; and deregistering the required automatic program initiation on eject, wherein the deregistering is based on the executing of the executable program content, wherein determining if an automatic program initiation on eject is required and storing, on the device, the executable program content, are performed prior to detecting an eject event.

9. The computer system of claim 8, wherein the determining if the automatic program initiation on eject is required for the at least one program associated with the mountable medium comprises examining a system configuration file associated with the mounted medium.

10. The computer system of claim 8, wherein the registering the required automatic program initiation on eject comprises registering the required automatic program initiation on eject in a system registry associated with the device in which the mountable medium is mounted.

11. The computer system of claim 8, wherein the storing an executable program content comprises a loading of the executable program content associated with the registered automatic program initiation on eject for the at least one program associated with the mounted medium onto at least one storage device.

12. The computer system of claim 11, wherein the at least one storage device comprises at least one of memory storage and disk storage.

13. The computer system of claim 10, wherein the determining if the automatic program initiation on eject is required for the at least one program associated with the ejected mounted medium comprises examining the system registry associated with the device in which the mounted medium is ejected.

14. The computer system of claim 8, wherein the mountable medium comprises a mountable medium capable of storing an executable program content.

15. A computer program product for automatic execution of at least one program associated with a mountable medium capable of storing an executable program content, wherein the mountable medium is ejected from a device, the computer program product comprising:

one or more computer-readable storage devices and program instructions stored on at least one of the one or more tangible storage devices, the program instructions executable by a processor, the program instructions comprising:

program instructions to determine if an automatic program initiation on eject is required for the at least one program associated with the mounted medium, wherein the determining is based on a detection of the mounted medium being mounted in the device;

program instructions to register the required automatic program initiation on eject, wherein the registering is based on the determination of the automatic program initiation on eject being required;

program instructions to store, on the device, the executable program content associated with the registered automatic program initiation on eject, wherein the executable program content associated with the registered automatic program initiation on eject is written and stored on the mounted medium at the time the mounted medium is mounted in the device and comprises of a plurality of auto run programs that is stored for later execution;

program instructions to execute the executable program content stored on the device, wherein the execution is based on a detection of the mounted medium being ejected from the device; and program instructions to deregister the required automatic program initiation on eject, wherein the deregistering is based on the executing of the executable program content, wherein determining if an automatic program initiation on eject is required and storing, on the device, the executable program content, are performed prior to detecting an eject event.

16. The computer program product of claim 15, wherein the determining if the automatic program initiation on eject is required for the at least one program associated with the mountable medium comprises examining a system configuration file associated with the mounted medium.

17. The computer program product of claim 15, wherein the registering the required automatic program initiation on eject comprises registering the required automatic program initiation on eject in a system registry associated with the device in which the mountable medium is mounted.

18. The computer program product of claim 15, wherein the storing an executable program content comprises a loading of the executable program content associated with the registered automatic program initiation on eject for the at least one program associated with the mounted medium onto at least one storage device.

19. The computer program product of claim 18, wherein the at least one storage device comprises at least one of memory storage and disk storage.

20. The computer program product of claim 17, wherein the determining if the automatic program initiation on eject is required for the at least one program associated with the ejected mounted medium comprises examining the system registry associated with the device in which the mounted medium is ejected.

* * * * *